ized Patent No.: US 8,760,096 B2
(45) Date of Patent: Jun. 24, 2014

(12) United States Patent
Inamura et al.

(54) CONTROL APPARATUS FOR POWER CONVERSION SYSTEM INCLUDING DC/AC CONVERTER CONNECTED BETWEEN ELECTRIC ROTATING MACHINE AND DC POWER SOURCE

(75) Inventors: Hiroshi Inamura, Nagoya (JP); Hiroya Tsuji, Yokkaichi (JP)

(73) Assignee: Denso Corporation, Kariya (JP)

( * ) Notice: Subject to any disclaimer, the term of this patent is extended or adjusted under 35 U.S.C. 154(b) by 252 days.

(21) Appl. No.: 13/272,513

(22) Filed: Oct. 13, 2011

(65) Prior Publication Data

US 2012/0091933 A1    Apr. 19, 2012

(30) Foreign Application Priority Data

Oct. 15, 2010    (JP) .................................. 2010-232164

(51) Int. Cl.
*H02P 3/12*        (2006.01)
*H02P 6/00*        (2006.01)

(52) U.S. Cl.
CPC ...................................... *H02P 6/001* (2013.01)
USPC .............. 318/400.3; 318/400.01; 318/400.26; 318/700

(58) Field of Classification Search
CPC ....................................................... H02P 6/001
USPC ...................... 318/400.26, 400.01, 700, 400.3
See application file for complete search history.

(56) References Cited

U.S. PATENT DOCUMENTS 5,291,106 A * 3/1994 Murty et al. .................. 318/375
5,650,713 A * 7/1997 Takeuchi et al. ................ 322/16
5,877,601 A * 3/1999 Obara et al. ................... 318/139
7,170,245 B2 * 1/2007 Youm ............................ 318/375
7,650,760 B2 * 1/2010 Nakata et al. ................ 62/228.1

FOREIGN PATENT DOCUMENTS

| CN | 1778032 A | 5/2006 |
|---|---|---|
| JP | 9-70196 | 3/1997 |
| JP | P2010-130841 A | 6/2010 |
| JP | P2010-167803 A | 8/2010 |

OTHER PUBLICATIONS

Japanese Office Action dated Aug. 28, 2012, issued in corresponding Japanese Application No. 2010-232164 with English translation.
Office Action (6 pgs.) dated Nov. 28, 2013 issued in corresponding Chinese Application No. 201110319926.3 with an at least partial English-language translation thereof (9 pgs.).

* cited by examiner

*Primary Examiner* — David Luo
(74) *Attorney, Agent, or Firm* — Nixon & Vanderhye PC

(57) ABSTRACT

A control apparatus is for use in a power conversion system including a DC/AC converter circuit connected to an electric rotating machine at output terminals thereof and to a DC power source at input terminals thereof through a switching means, a capacitor being connected across the input terminals of the DC/AC converter circuit. The control apparatus includes a current supply means configured to perform current supply control to supply a current to the electric rotating machine in order to discharge the capacitor by manipulating the DC/AC converter circuit in a state where the switching means is set open, and a speed lowering means configured to apply a brake force to a rotating shaft of the electric rotating machine to reduce a rotational speed of the electric rotating machine prior to the current supply control being performed by the current supply means if the rotational speed exceeds a specified speed.

6 Claims, 4 Drawing Sheets

CONTROL APPARATUS FOR POWER CONVERSION SYSTEM INCLUDING DC/AC CONVERTER CONNECTED BETWEEN ELECTRIC ROTATING MACHINE AND DC POWER SOURCE

This application claims priority to Japanese Patent Applications No. 2010-232164 filed on October 15, the entire contents of which are hereby incorporated by reference.

BACKGROUND OF THE INVENTION

1. Field of the Invention

The present invention relates to a control apparatus for a power conversion system including a DC/AC converter circuit connected to an electric rotating machine at its output terminals and to a DC power source at its input terminals through a switching means, a capacitor being connected across the input terminals of the DC/AC converter circuit, the control apparatus operating to control the electric rotating machine by manipulating the DC/AC converter circuit, and including a current supply means to supply a current to the electric rotating machine in order to discharge the capacitor by manipulating the DC/AC converter circuit when the switching means is set open.

2. Description of Related Art

Japanese Patent Application Laid-open No. H9-70196 describes such a control apparatus configured to control a current supplied to a three-phase permanent magnet motor such that a command current in the q-axis direction is kept at 0, and a current in the d-axis direction is kept larger than 0 in absolute value, in order to enable discharging a capacitor connected across input terminals of an inverter as a DC/AC converter circuit while preventing the motor from generating torque. This is possible because the torque T of the motor is represented by the torque formula of $T=p\{\phi+(L_d-L_q)\}i_d \cdot i_q$, where id is a d-axis current, iq is a q-axis current, Ld is a d-axis inductance, Lq is a q-axis inductance, $\phi$ is an armature interlinkage flux constant, and p is the number of pole pairs.

The above method needs to detect an electrical angle of the motor while performing current supply control to discharge the capacitor. Accordingly, if there is an error in the detected electrical angle, the phase of the motor current (the current supplied to the motor) may be erroneously determined to be along the d-axis, as a result of which the motor generates torque. In this case, if the current supply control is performed while the motor is not stationary, the motor continues to be driven regeneratively to generate electric power and the phase of the motor current continues to be erroneously determined to be along the d-axis if this torque is a load torque. This may degrade controllability of the time necessary to complete the discharge of the capacitor.

One of factors that cause a torque in the motor is an error of the above torque formula. That is, the above torque formula is derived from a simple motor model in which the values of the d-axis inductance Ld and the q-axis inductance Lq are fixed. However, an actual motor has an inductance component resulting from spatial harmonics which are dependent on the electrical angle of the motor. Accordingly, even when the motor current is supplied such that its phase is along the d-axis, torque may occur in the motor. This disadvantage is significant in a permanent magnet motor having concentrated windings in which spatial harmonic are conspicuous.

SUMMARY

An exemplary embodiment provides a control apparatus for use in a power conversion system including a DC/AC converter circuit connected to an electric rotating machine at output terminals thereof and to a DC power source at input terminals thereof through a switching means, a capacitor being connected across the input terminals of the DC/AC converter circuit, the control apparatus comprising:

a current supply means configured to perform current supply control to supply a current to the electric rotating machine in order to discharge the capacitor by manipulating the DC/AC converter circuit in a state where the switching means is set open; and a speed lowering means configured to apply a brake force to a rotating shaft of the electric rotating machine to reduce a rotational speed of the electric rotating machine prior to the current supply control being performed by the current supply means if the rotational speed exceeds a specified speed.

According to the exemplary embodiment, it is possible to reliably discharge the capacitor of such a power conversion system to reduce the voltage of the capacitor below a specified voltage.

Other advantages and features of the invention will become apparent from the following description including the drawings and claims.

PREFERRED EMBODIMENTS OF THE INVENTION

First Embodiment

Figure 1:
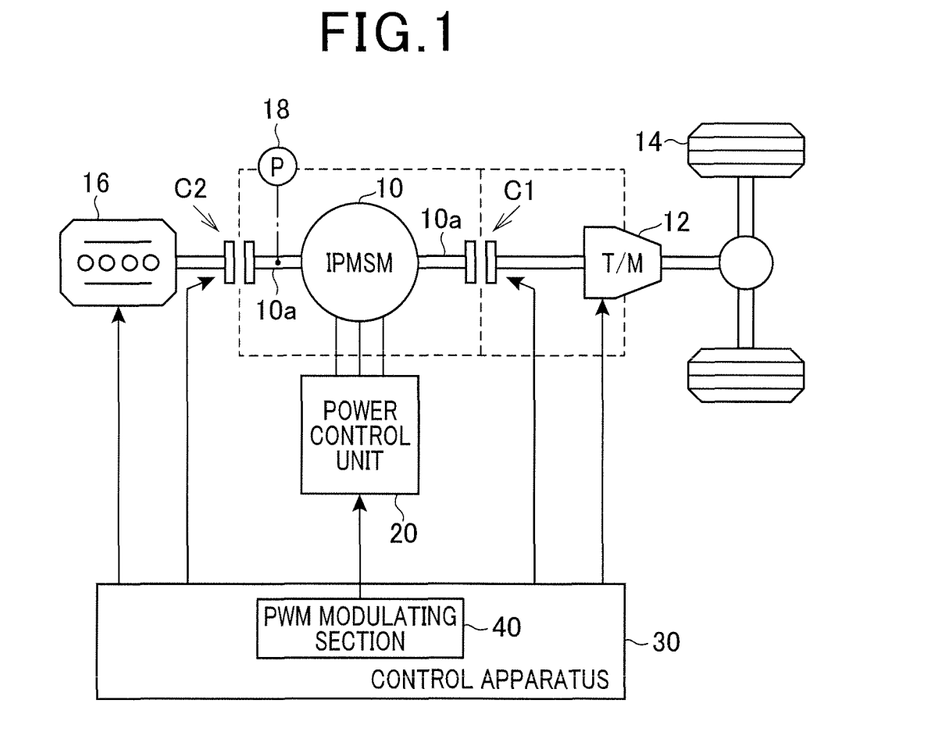
FIG. 1 is a diagram showing the schematic structure of a power conversion system including a control apparatus as a first embodiment of the invention.

FIG. 1 is a diagram showing the schematic structure of a power conversion system including a control apparatus as a first embodiment of the invention.

The control apparatus is for controlling a three phase motor-generator 10 mounted on a vehicle as a vehicle main engine.

As shown in FIG. 1, the motor-generator 10 is mechanically coupled to drive wheels 14 of the vehicle. More specifically, the rotating shaft 10a of the motor-generator 10 is mechanically coupled to the drive wheels 14 through a clutch C1 of the electronically controlled type and a transmission 12. In this embodiment, the motor-generator 10 is an IPSM (Interior Permanent Magnet Synchronous Motor) having concentrated windings.

The rotating shaft 10a of the motor-generator 10 is also mechanically coupled to an internal combustion engine 16 through a clutch C2 of the electronically-controlled type. The clutch C1 is a wet-type clutch, and the clutch C2 is a dry-type clutch. The clutches C1 and C2 and the transmission 12 are supplied with lubricating oil by an oil pump 18. The oil pump 18 is driven by the rotating shaft 10a of the motor-generator 10. The direction of rotation of the oil pump 18 is limited to one direction (the forward direction). If the oil pump 18 rotates in the reverse direction at a speed higher than a specified speed, performance of the oil pump 18 may be degraded. Accordingly, in this embodiment, the oil pump 18 is driven to rotate in the forward direction only. Incidentally, to reverse the direction of rotation of the drive wheels 14, the sign of the transmission gear ratio of the transmission 12 is reversed.

A control apparatus 30 operates to control controlled variables of the engine 16, the motor-generator 10 and the transmission 12. More specifically, the control apparatus 30 manipulates a power control unit 20 to control controlled variables of the motor-generator 10. The control apparatus 30 also operates to engage and disengage the clutches C1 and C2.

Figure 2:
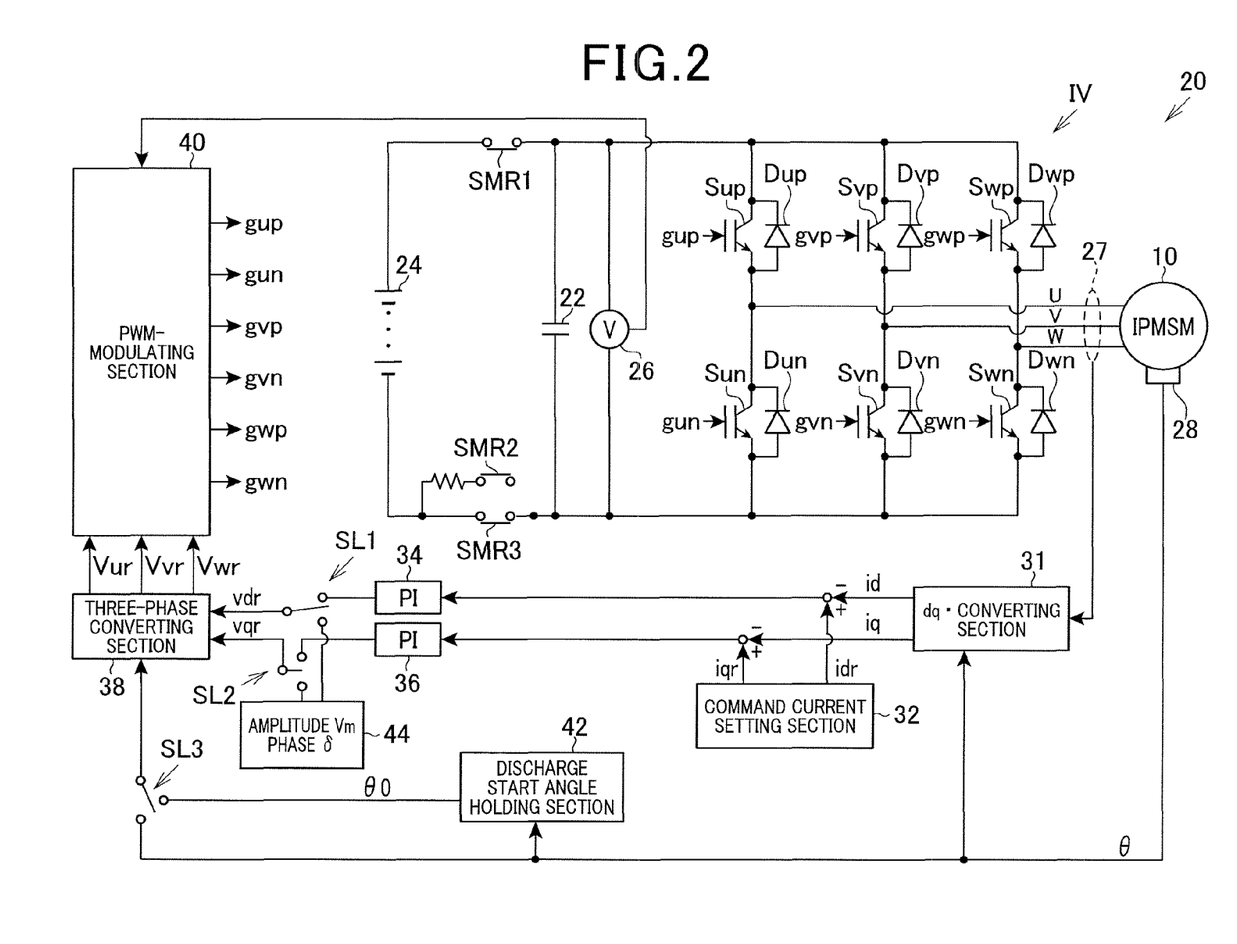
FIG. 2 is a diagram showing part of the electrical structure of the power conversion system, the part being for controlling the motor-generator.

FIG. 2 is a diagram showing part of the electrical structure of the power conversion system, the part being for controlling controlled variables of the motor-generator.

As shown in FIG. 3, the respective phases of the motor-generator 10 are connected to a high voltage secondary 24 as a DC power source through an inverter IV and relays SMR1, SMR2, SMR3 and SMR4. The terminal voltage of the high voltage battery 24 is at several hundred volts.

The inverter IV includes three pairs of series connections, each series connection being constituted of a switching element S*p and a switching element S*n (*=u, v, w) connected in series. The connection nodes of these series connections are respectively connected to the U, V and W phases of the motor-generator 10. In this embodiment, the switching elements S*p and S*n are IGBTs. Each of these switching elements S*# (#=p, n) is parallel-connected in opposite direction with a diode D*#.

To detect the operation states of the motor-generator 10 and the inverter IV, the power conversion system of this embodiment includes a rotational angle sensor 28 for detecting the electrical angle (rotational angle θ) of the motor-generator 10, a current sensor 27 for detecting the phase currents iu, iv and iw respectively flowing through the three phases of the motor-generator 10, and a voltage sensor for detecting the voltage across the input terminals of the inverter IV.

A smoothing capacitor 22 is connected across the input terminals of the inverter IV. One of the input terminals of the inverter IV is connected to one terminal of the relay SMR1, and the other input terminal is connected to one terminals of the relays SMR2 and SMR3. The other terminal of the relay SMR1 is connected to the positive terminal of the high voltage battery 24. The other terminal of the relay SMR3 is connected to the negative terminal of the high voltage battery 24. The other terminal of the relay SMR3 is connected to the negative terminal of the high voltage battery 24 through a resistor. This smoothing capacitor 22 is charged at the level of the terminal voltage of the high voltage battery 24 while the relays SMR1 to SMR3 are closed.

Next, the operation of the motor-generator 10 in the normal state is explained. A dq-converting section 31 converts the phase currents iu, iv and iw detected by the current sensor 27 into the d-axis current id and the q-axis current iq in a rotating coordinate system. A command current setting section 32 sets a d-axis command current idr and a q-axis command current iqr in the rotating coordinate system (dq-coordinate system). A feedback control section 34 calculates a d-axis command voltage vdr as a manipulation amount for feedback-controlling the d-axis current id at the d-axis command current idr using its proportional controller and an integral controller. A feedback controller 36 calculates a q-axis command voltage vqr as a manipulation amount for feedback-controlling the q-axis current iq at the q-axis command current iqr using its proportional controller and an integral controller.

A three-phase converting section 38 converts the command voltages vdr and vqr into a U-phase command voltage Vur, a V-phase command voltage Vvr and W-phase command voltage Vwr based on the rotational angle θ detected by the rotational angle sensor 28. A PWM modulating section 40 generates a PWM signal used to convert the three-phase output voltage of the inverter IV into a voltage modelling the command voltages Vur, Vvr and Vwr. In this embodiment, the PWM signal is generated by comparing a carrier having a triangular wave shape with the command voltages Vur, Vvr and Vwr detected by the voltage sensor 26 and normalized with respect to the input voltage of the inverter IV. The generated PWM signal makes a manipulation signal g*# for the switching element S*# (*=u, v, w; #=p, n) of the inverter IV.

Next, discharge control of the smoothing capacitor 22 using the motor-generator 10 is explained.

a discharge start angle storing section 42 stores the rotation angle of the motor-generator 10 at a moment when discharge of the smoothing capacitor 22 is started as a start angle θ0. A discharge voltage setting section 44 sets a command voltage as a manipulation amount by which the current flowing through the motor-generator 10 is openloop-controlled to have a phase of a current assumed to be a reactive current. This can be done by properly setting the amplitude Vm and phase δ of the command voltage. Specifically, the phase δ is set to such a value that makes the sign of the d-axis command current idr positive, and makes the q-axis command current iqr zero. This is because, torque T generated in an IPSM is given by the following torque formula (c1) where the d-axis inductance is Ld, the q-axis inductance is Lq, the d-axis current is id, the q-axis current is iq, the armature interlinkage flux constant is φ, and the number of the pole pairs is P.

$$T = P\{\phi iq + (Ld - Lq) id \cdot iq\} \quad (c1)$$

Accordingly, the torque T can be made 0 by making the q-axis current equal to 0.

To discharge the smoothing capacitor 22, selectors SL1 and SL2 are operated to select the command voltages vdr and vqr set by the discharge voltage setting section 44, so that the command voltages vdr and vqr are inputted to the three-phase converting section 38. The three-phase converting section 38 converts the command voltages vdr and vqr into the three-phase command voltages vur, vvr and vwr based on the start angle θ0, so that the direction of the vector of the command voltage is along the direction in which a reactive current is assumed to flow.

In the following, there is explained the technical meaning of suppressing variation of the direction of the vector of the current in a stationary coordinate system by using the start angle θ0 at the time of discharging the smoothing capacitor 22.

In a case where the phase of the current flowing through the motor-generator 10 is varied in accordance with variation of the rotational angle θ0 of the motor-generator 10 in order that the current flowing through the motor-generator 10 is a reactive current, if there is an error in the vector direction in which the reactive current is assumed to flow, the phase of the current actually flowing through the motor-generator 10 is shifted from the phase of the reactive current. In this case, torque is generated in the motor-generator 10 as seen from the above torque formula (c1). When the motor-generator 10 rotates due to this torque, the direction of the vector in the stationary coordinate system of the current flowing through the motor-generator 10 is varied in accordance with the rotational angle θ detected by the rotational angle sensor 28, and the control apparatus 30 operates to keep constant the phase of the current irrespective of the rotational angle. Hence, the phase of the current flowing through the motor-generator 10 is controlled at the phase of the reactive current expected from the present rotational angle θ detected by the rotational angle sensor 28. Accordingly, there is a concern that torque continues to be generated in the motor-generator 10, and accordingly the motor generator 10 continues to rotate while the current flows through the motor-generator 10.

Figure 3A:
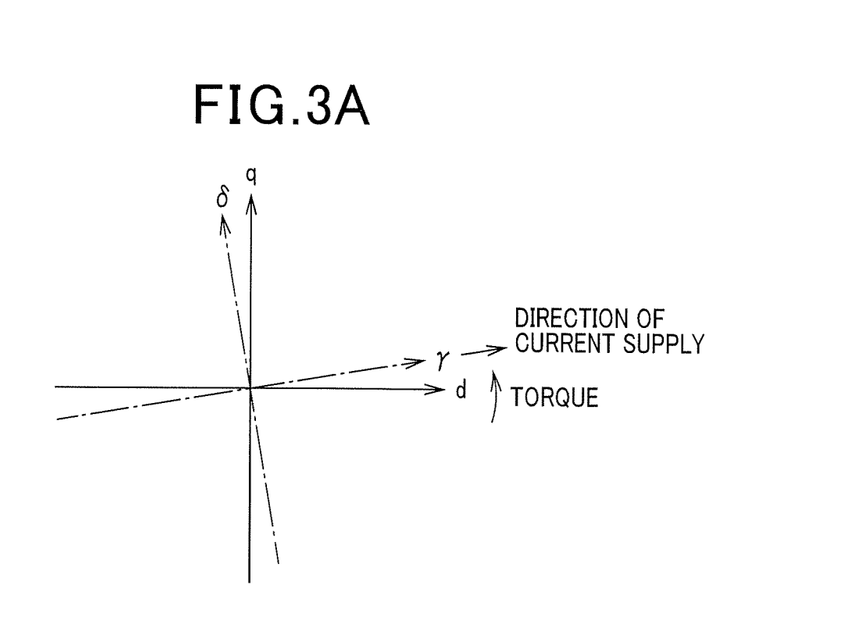
FIGS. 3A and 3B are diagrams showing the principal of control for fixing the rotational angle of the motor-generator.
Figure 3B:
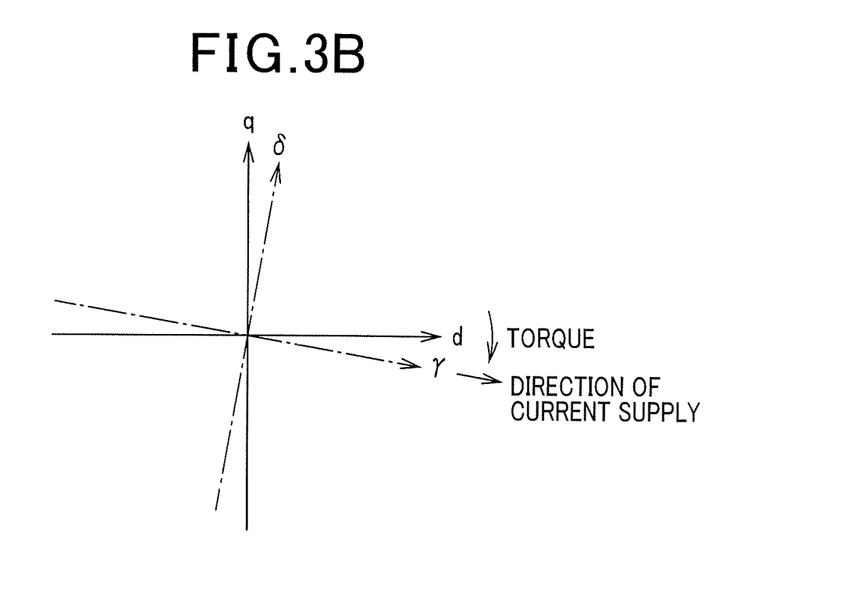

However, by the provision of the discharge voltage setting section 44, the phase of the current flowing through the motor-generator 10 is openloop-controlled at the phase of the reactive current expected from the start angle θ0. Accordingly, when the d-axis (γ-axis) erroneously recognized based on the start angle θ0 is on the advanced side of the actual d-axis as shown in FIG. 3A, the motor-generator 10 is applied with torque in a direction to advance the rotational angle θ. Hence, the difference between the actual d-axis and the erroneously recognized d-axis (γ-axis) is decreased. On the other hand, when the d-axis (γ-axis) erroneously recognized based on the start angle θ0 is on the delayed side of the true d-axis as shown in FIG. 3B, the motor-generator 10 is applied with torque in a direction to delay the rotational angle θ. Hence, the difference between the true d-axis and the erroneously recognized d-axis (γ-axis) is decreased. As a result, since the d-axis (γ-axis) erroneously recognized based on the start angle θ0 coincides with the actual d-axis, the torque occurred in the motor-generator 10 becomes zero. Incidentally, in the example shown in FIG. 3A, if the actual d-axis overshoots to the advanced side of the γ-axis by passing a current in the direction of the erroneously recognized d-axis (γ-axis) based on the start angle θ0, since the state changes to that shown in FIG. 3B, and accordingly the direction of the torque occurred is reversed, the difference between the actual d-axis and the γ-axis is decreased. Likewise, in the example shown in FIG. 3B, if the actual d-axis overshoots to the delayed side of the γ-axis by passing a current in the direction of the erroneously recognized d-axis (γ-axis), since the state changes to that shown in FIG. 3A, and accordingly the direction of the torque occurred is reversed, the difference between the actual d-axis and the γ-axis is decreased. In the above described way, the direction of the actual d-axis is aligned to the direction of the γ-axis.

As described above, according to the discharge control in this embodiment, since the motor-generator 10 is controlled to be stationary, robust control can be implemented to suppress variation of the rotation angle θ0 of the motor generator 10 from the start angle θ0 during discharge control of the smoothing capacitor 22.

Incidentally, there may occur case where a request to discharge the smoothing capacitor 22 occurs when the motor-generator 10 is rotating. Especially, when the motor-generator 10 needs to run even after the drive wheels 14 of the vehicle are stopped, such a case may occur frequently. In the following, an example of such a case is described In this embodiment, it is necessary for the oil pump 18 to supply oil continuously to the clutches C1 and C2 and the transmission 12 so that the clutch C1 can be engaged promptly when the vehicle needs to start, or the clutch C2 can be engaged promptly when the engine 16 has to supply power. Accordingly, although the clutches C1 and C2 are disengaged when the drive wheels 14 are stopped, the control of rotation of the motor-generator 10 is continued in order that supply of oil to the clutches C1 and C2 and the transmission 12 is continued using power generated by the motor-generator 10. Under such circumstances, when a request to stop the motor-generator 10 occurs and then a request to stop discharge the smoothing capacitor 22 occurs, there may occur a case in which the motor-generator 10 is rotating at a relatively high speed immediately after the request to discharge the smoothing capacitor 22 has occurred.

The inventors of this invention found that if the smoothing capacitor 20 is discharged while the motor-generator 10 is running at a relatively high speed, the following two problems may occur.

The first problem is that since there occurs torque causing the motor-generator 10 to rotate in the direction opposite to the direction in which the motor-generator 10 is rotating, the motor-generator 10 generates electric power as a result of which the smoothing capacitor 22 is charged. This may degrade controllability of discharge of the smoothing capacitor 22 in terms of time necessary to complete the discharge. The second problem is that if a discharge current of the smoothing capacitor 20 is increased to shorten the time to complete discharge of smoothing capacitor 22, the torque in the direction opposite to the direction in which the motor-generator 10 is rotating may increase. This may reverse the direction of rotation of the motor-generator 10, and accordingly the oil pump 18 may rotate reversely at a substantial speed, as a result of which performance of the oil pump 18 may be degraded.

Figure 4:
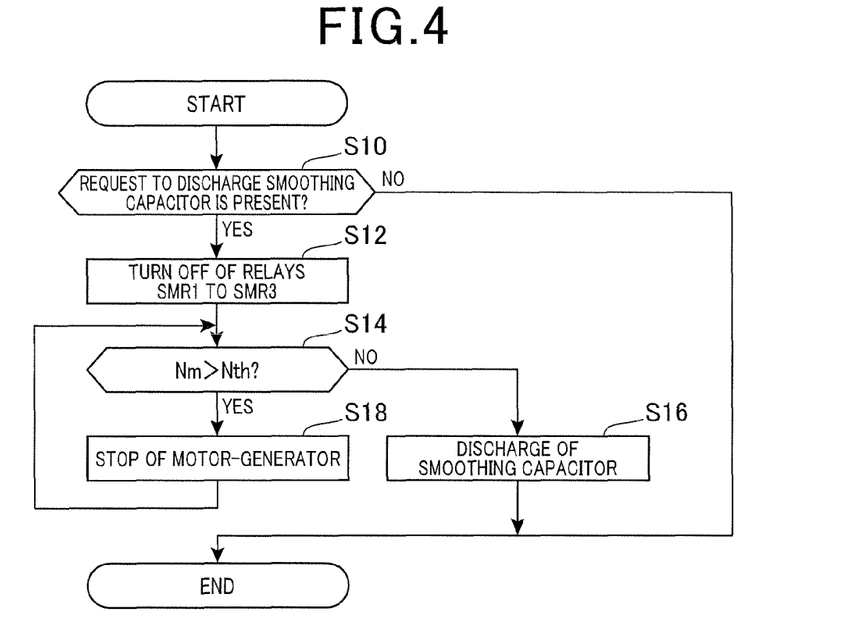
FIG. 4 is a flowchart showing a discharge process of a capacitor included in the power conversion system.

In this embodiment, the process shown in FIG. 4 is performed to prevent these problems.

FIG. 4 is a flowchart showing the discharge process of the smoothing capacitor 22. This process is performed repeatedly at regular time intervals by the control apparatus 30.

This process begins by determining in step S10 whether or not a request to discharge the smoothing capacitor 22 has occurred. In this embodiment, if a start switch of the vehicle is detected to be turned off, it is determined that a request to discharge the smoothing capacitor 22 has occurred. Here, the start switch is a means for indicating the vehicle driver's will regarding permission or inhibition of running of the vehicle. The start switch is not limited to a manual switch. For example, the start switch may be a switch automatically turned off when the distance between the vehicle and a portable radio device carried by the vehicle driver exceeds a predetermined distance.

If the determination result in step S10 is affirmative, the process proceeds to step S12 to open the relays SMR1 to SMR3. In subsequent step S14, it is determined whether or not the rotational speed Nm of the motor-generator 10 exceeds a specified speed Nth. The specified speed Nth is set below an upper limit speed above which performance of the oil pump 18 may be degraded if the motor-generator 10 rotates reversely by the discharge control of the smoothing capacitor 22. If the determination result in step S14 is negative, the process proceeds to step S16 in which the start angle θ0 is set as described above, and then a reactive current is passed to the motor-generator 10 in order to discharge the smoothing capacitor 22.

If the determination result in step S14 is affirmative, the process proceeds to step S18 to stop the motor-generator 10, for example, by causing the motor-generator 10 to generate electric power by setting a required torque of the motor-generator 10 to a negative value, or by setting a command rotational speed to 0 in a case where the command current setting section 32 is inputted with a command rotational speed instead of a required torque.

By applying a load torque to the motor-generator 10 in this way, the rotational speed Nm of the motor-generator 10 decreases below the specified speed Nth, and thereafter process proceeds to step S16.

When step S16 is completed, or if the determination result in step S10 is negative, the process is terminated.

The first embodiment described above provides the following advantages.

(1) If the rotational speed Nm of the motor-generator 10 exceeds the specified speed Nth, the rotational speed Nm is decreased by applying a brake force to the rotating shaft 10a of the motor-generator 10 before discharging the smoothing capacitor 22. This makes it possible to prevent that the motor-generator 10 generates electric power unexpectedly during the discharge control of the smoothing capacitor 22, and the motor-generator 10 rotates reversely.

(2) The command voltages vdr and vqr are set such that the current flowing through the motor-generator 10 is open-controlled at the direction of the vector of a reactive current (the positive direction of the d-axis) when the start angle θ0 is assumed to be the actual rotational angle of the motor-generator 10. This makes it possible to prevent the direction of the vector of the current flowing through the motor generator 10 in the stationary coordinate system from being varied by the rotation of the motor-generator 10, to thereby apply a brake force to the motor-generator 10 necessary to stop the motor-generator 10 at a predetermined rotational angle.

(3) A brake force is applied to the rotating shaft 10a of the motor-generator 10 by manipulating the inverter IV. This makes it possible to decrease the rotational speed of the motor-generator 10 without provision of an additional hardware means.

(4) The oil pump 18 which is inhibited from rotating in the reverse direction is mechanically coupled to the rotating shaft 10a of the motor generator 10. Accordingly, since there is possibility that performance of the oil pump 18 is degraded if the discharge control of the smoothing capacitor 22 is started when the motor-generator 10 is rotating at a high speed, it is effective to control the rotational speed Nm of the motor-generator 10 below the specified speed Nth.

(5) The clutch C1 is provided for releasing the mechanical coupling between the motor-generator 10 and the drive wheels 14. Accordingly, it may often occur that the rotational speed of the motor-generator 10 becomes excessively high when there is a request to discharge smoothing capacitor 22. Hence, it is effective to provide the means for controlling the rotational speed Nm of the motor-generator 10 below the specified speed Nth.

Second Embodiment

Next, a second embodiment of the invention is described with particular emphasis on the difference with the first embodiment.

Figure 5:
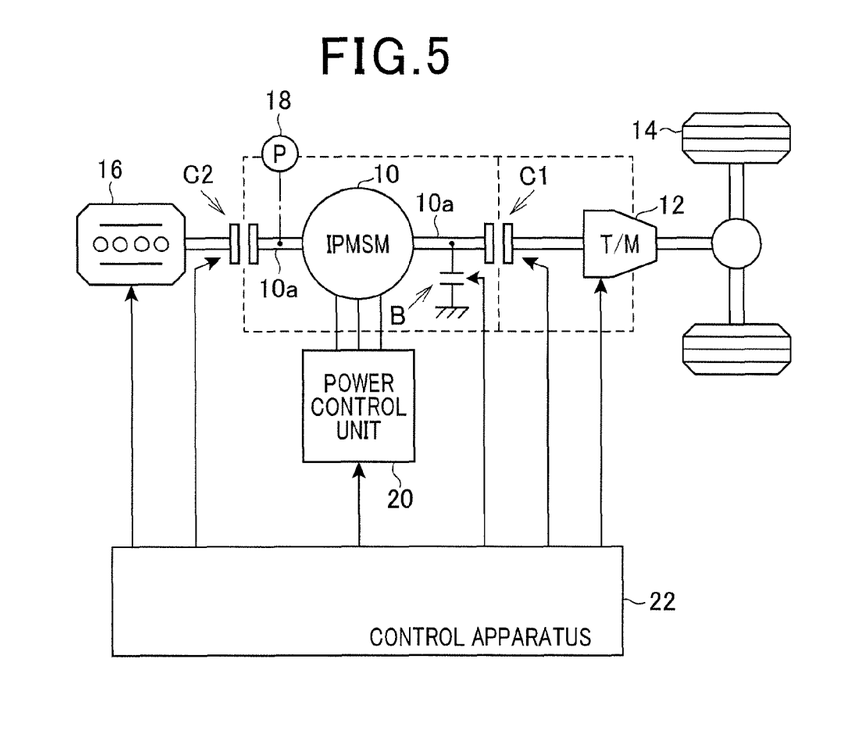
FIG. 5 is a diagram showing the schematic structure of a power conversion system including the control apparatus as a second embodiment of the invention.

FIG. 5 is a diagram showing the schematic structure of a power conversion system including the control apparatus as a second embodiment of the invention. In FIG. 5, the reference numerals identical to those in FIG. 1 represent the same elements.

As shown in FIG. 5, the second embodiment is provided with a brake device B of the electronically-controlled type configured to apply a brake force to the motor-generator 10 by mechanically contacting the rotating shaft 10a of the motor-generator 10. If the rotational speed Nm of the motor-generator 10 exceeds the specified speed Nth when a request to discharge the smoothing capacitor 20 has occurred, the brake device B operates to decrease the rotational speed Nm of the motor-generator 10. According to the second embodiment, it is possible to decrease the rotational speed Nm of the motor-generator 10 without increasing the charge stored in the smoothing capacitor 22.

Other Embodiments

The above embodiments may be modified as described below.

Regarding the Voltage Setting Means:

The voltage setting means for setting the command voltage in the stationary coordinate system to the direction of the vector of a current which is assumed to cause no torque in the stationary coordinate system is not limited to one that sets the command voltage in the direction of the q-axis recognized based on the start angle θ0 to 0, and sets the command voltage in the d-axis to a positive or negative value. For example, the command voltage may be set such that the direction of its vector is slightly different from the direction of the vector of the current which is assumed to cause no torque in the stationary coordinate system during the discharge control of the smoothing capacitor 22 performed when the motor-generator 10 is substantially stationary.

Regarding the Command Voltage Fixing Means:

The command voltage fixing means is not limited to one constituted of the command voltage setting means configured to set the torque or rotational speed of the motor-generator 10 at a non-zero value in the normal state, and the discharge voltage setting section 44. For example, it may be constituted of a means configured to set an input parameter of the three-phase converting section 38 as the start angle θ0 held by the discharge start angle holding section 42, and to stop operation of the dq-converting section 31 and the integral controllers of the feedback control sections 34 and 36. In this case, the direction of the vector of the current flowing through the motor-generator 10 is openloop-controlled such that the phases of the command currents idr and iqr set by the command current setting section 32 agree with the direction shown in the stationary coordinate system when the motor-generator 10 is at the start angle θ0 held by the discharge start angle holding section 42.

Regarding the Robust Control Means:

The robust control means to suppress variation of the direction of the vector of the current flowing through the motor-generator 10 in the stationary coordinate system is not limited to the command voltage fixing means. For example, it may be configured to variably set the phases of the command currents idr and iqr set by the command current setting section 32 by a same amount in the direction opposite to the direction in which the rotational angle has changed with respect to the start angle θ0 during the discharge control. This configuration also makes it possible to suppress variation of the directions of the vectors of the command currents idr and iqr set based on the start angle θ0. Also in this configuration, it is advantageous to discharge the smoothing capacitor 22 while the rotational speed of the motor-generator 10 is lowered. Because, if the robust control means starts the discharge control when the rotational speed of the motor-generator 10 is high, since the torque applied to the motor-generator 10 takes both positive and negative signs, it is difficult to accurately control the time at which the discharge is completed. In addition, if the command currents idr and iqr are increased to shorten the time necessary to complete the discharge, there is a concern that the motor-generator 10 may rotate reversely at a high speed.

Regarding the Current Supply Means:

The current supply means for performing the current supply control to the motor-generator 10 to discharge the smoothing capacitor 22 to thereby reduce the charged voltage below a specified voltage is not limited to the robust control means. For example, it may be a control means configured to pass a current in the direction of the d-axis estimated based on the rotational angle θ at every moment. Also in this case, torque occurs if the direction of the actual d-axis is different from that of the estimated d-axis. If this torque is a negative torque, since generated electric power increases with the increase of the rotational speed of the motor-generator 10, there is a problem that it may becomes difficult to accurately control the time to complete the discharge of the smoothing capacitor 22. Accordingly, also in this case, it is advantageous for the current supply control means to operate after the rotational speed of the motor-generator 10 is decreased.

Incidentally, such a problem is serious only when the current supply means is configured to variably change the phase of the current flowing through the motor-generator 10.

Regarding the Speed Lowering Means:

The configuration of the speed lowering means is not limited to the one described in the above embodiments. For example, the means to manipulate the inverter IV may be constituted of means to short-circuit the upper arms by turning on the switching elements Sup, Svp and Swp, and means to short-circuit the lower arms by turning on the switching elements Sun, Svn and Swn. The brake means to apply a brake force to the rotating shaft 10a of the motor-generator 10 by contacting it is not limited to the brake device B. For example, it may be one configured to bring the clutch C1 into a half clutch state while the driver wheels 14 are applied with a brake force.

Regarding the Vehicle on which the Power Conversion System is Mounted:

In the above embodiments, the power conversion system is mounted on the hybrid vehicle having the structure shown in FIG. 1. However, the power conversion system of the invention may be mounted on a hybrid vehicle having a structure not including components that require inhibiting the motor-generator 10 from rotating reversely, such as the oil pump 18. Also in the case where there is no restriction to inhibit the motor-generator 10 from rotating reversely, since it is difficult to control the time necessary to complete the discharge of the smoothing capacitor 22 when the motor-generator 10 is rotating at a high speed, it advantageous to provide the system with the speed lowering means.

The power conversion system of the invention can be used other than the parallel hybrid vehicle, such as a series hybrid vehicle or a parallel-series hybrid vehicle. Further, the power conversion system of the invention can be used for an electric vehicle whose main engine is an electric rotating machine only. In this case, provision of the above speed lowering means is advantageous particularly when the electric vehicle includes means for releasing mechanical coupling between the electric rotating machine as a main engine and the drive wheels. Because, it may often occur that the electric rotating machine rotates at a high speed even when the drive wheels are stopped.

Regarding the Electric Rotating Machine:

In the above embodiment, the electric rotating machine is an IPMSM having concentrated windings. However, the IPMSM may have distributed windings instead of the concentrated windings.

Further, the electric rotating machine of the synchronous type may be an SPMSM (Surface Permanent Magnet Synchronous Motor). In the case of an SPMSM, since the torque formula is that in which Ld=Lq in the torque formula (c1), it is possible to control the actual rotational angle θ at the start angle θ0 regardless whether the command current whose d-axis component is positive or negative.

Further, the electric rotating machine of the synchronous type is not limited to one that includes permanent magnets. It may be one including a field winding. In this case, since the d-axis is along a field winding, the command voltage is applied as pulse voltages in the direction of the d-axis detected based on the start angle θ when the motor-generator is substantially stationary.

Further, the electric rotating machine is not limited to one mounted on a vehicle as a main engine. It may be one that operates on electric power supplied from the high voltage battery 24 to drive an electric compressor. In the above embodiments, the high voltage battery 24 is directly connected to the input terminals of the inverter IV. However, the high voltage battery 24 may be connected to the input terminals of the inverter IV through a step-up converter constituted of a reactor, a switching element parallel-connected to the smoothing capacitor 22 through this reactor, and a capacitor connected to a series connection of the switching element and a freewheel diode. In this case, the capacitor connected to the output terminals of the step-up converter and the smoothing capacitor 22 are objects of the discharge control. The smoothing capacitor 22 is discharged through the freewheel diode such that its voltage decreases with the decrease of the voltage of the capacitor of the step-up converter.

In the above embodiments, each of the feedback control sections 34 and 36 is constituted of a proportional controller and an integral controller. However, they may be constituted of a proportional-integral controller, or of only a proportional control, or of only a integral controller.

The above explained preferred embodiments are exemplary of the invention of the present application which is described solely by the claims appended below. It should be understood that modifications of the preferred embodiments may be made as would occur to one of skill in the art,

What is claimed is:

1. A control apparatus for a power conversion system including a DC/AC converter circuit connected to an electric rotating machine at output terminals thereof and to a DC power source at input terminals thereof through a switching means, a capacitor being connected across the input terminals of the DC/AC converter circuit, the control apparatus comprising:

a current supply means configured to perform current supply control to supply a current to the electric rotating machine in order to discharge the capacitor by manipulating the DC/AC converter circuit in a state where the switching means is set open;

wherein the current supply means includes a robust control means configured to suppress variation of a direction of a vector of the current flowing through the electric rotating machine in a stationary coordinate system due to variation of a rotational angle of the electric rotating machine during the current supply control.

2. The control apparatus according to claim 1, wherein the current supply means includes a voltage setting means configured to set a command voltage to be applied to a stator winding of the electric rotating machine to openloop-control the direction of the vector of the current flowing through the electric rotating machine in accordance with the rotational angle of the electric rotating machine, and is configured to manipulate the DC/AC converter circuit based on the command voltage, the robust control means including a command voltage fixing means configured to fix the rotational angle of the electric rotating machine inputted to the voltage setting means as an input parameter at a value acquired prior to the current supply control being performed by the current supply means.

3. The control apparatus according to claim 1, wherein the power conversion system requires the electric rotating machine not to rotate reversely.

4. The control apparatus according to claim 1, wherein the electric rotating machine is mounted on a vehicle as a main engine of the vehicle, the power conversion system including a means to release a mechanical coupling between the electric rotating machine and drive wheels of the vehicle.

5. A control apparatus for a power conversion system including a DC/AC converter circuit connected to an electric rotating machine at output terminals thereof and to a DC power source at input terminals thereof through a switching means, a capacitor being connected across the input terminals of the DC/AC converter circuit, the control apparatus comprising:

a current supply means configured to perform current supply control to supply a current to the electric rotating machine in order to discharge the capacitor by manipulating the DC/AC converter circuit in a state where the switching means is set open; and a speed lowering means configured to apply a brake force to a rotating shaft of the electric rotating machine to reduce a rotational speed of the electric rotating machine prior to the current supply control being performed by the current supply means if the rotational speed exceeds a specified speed;

wherein the current supply means includes a robust control means configured to suppress variation of a direction of a vector of the current flowing through the electric rotating machine in a stationary coordinate system due to variation of a rotational angle of the electric rotating machine during the current supply control.

6. The control apparatus according to claim 5, wherein the current supply means includes a voltage setting means configured to set a command voltage to be applied to a stator winding of the electric rotating machine to openloop-control the direction of the vector of the current flowing through the electric rotating machine in accordance with the rotational angle of the electric rotating machine, and is configured to manipulate the DC/AC converter circuit based on the command voltage, the robust control means including a command voltage fixing means configured to fix the rotational angle of the electric rotating machine inputted to the voltage setting means as an input parameter at a value acquired prior to the current supply control being performed by the current supply means.

* * * * *